(12) United States Patent
Yen (10) Patent No.: US 7,277,515 B2
(45) Date of Patent: Oct. 2, 2007

(54) RECEIVER FOR BLOCK CODE IN NEAR-MINIMUM PHASE CHANNEL

(75) Inventor: Kuang-Yu Yen, TaiChung (TW)

(73) Assignee: Realtek Semiconductor Corp. (TW)

(*) Notice: Subject to any disclaimer, the term of this patent is extended or adjusted under 35 U.S.C. 154(b) by 788 days.

(21) Appl. No.: 10/324,577

(22) Filed: Dec. 19, 2002

(65) Prior Publication Data

US 2003/0123586 A1    Jul. 3, 2003

(30) Foreign Application Priority Data

Dec. 28, 2001    (TW) ............................. 90133479 A (51) Int. Cl.
*H04B 1/10* (2006.01)

(52) U.S. Cl. .................. 375/350; 375/229; 375/348; 375/262; 375/152; 375/261; 375/316; 714/752; 714/794

(58) Field of Classification Search ............ 375/350, 375/229, 348, 262, 152, 261, 316; 714/752, 714/794; 370/207; 708/314; 369/59.22
See application file for complete search history.

(56) References Cited

U.S. PATENT DOCUMENTS 5,822,143 A * 10/1998 Cloke et al. .............. 360/65
6,690,715 B2 * 2/2004 Webster et al. ............ 375/148
6,904,110 B2 * 6/2005 Trans et al. ................ 375/350
2003/0123585 A1 * 7/2003 Yen ........................... 375/350

OTHER PUBLICATIONS

Xiao-Yu Hu; Xiao-Hu Yu; "Three types of robust maximum-likelihood Viterbi decoder," IEEE Transactions on Consumer Electronics, vol. 43, No. 1, Feb. 1997 pp. 34-39.*
BVS Design Staff, "Spread Spectrum Series Part 2," Micriwace Product Digest, Mar. 2001 (http://www.bvsystems.com/Tech/Articles/articles.htm).*

* cited by examiner

*Primary Examiner*—David C. Payne
*Assistant Examiner*—Nader Bolourchi (57) ABSTRACT

The present invention generally relates to block code transmission receiver and method, and uses the maximum likelihood theory to generate correct block signal. The receiver of the present invention comprises a Feed-Forward Equalizer (FFE) for receiving block signal and converting the block signal into a first signal with minimum phase; an Inter-Symbol Interference (ISI) eliminator for receiving the first signal and a feedback signal that is used to eliminate the Inter-Symbol Interference of the first signal, the Inter-Symbol Interference (ISI) eliminator also generates a second signal not having Inter-Symbol Interference; a block detecting device for receiving the second signal and measuring the correlation between the second signal and each possible block, and for selecting the block code with the minimum distance as the best output block code; and a Feedback Equalizer (FBE) for receiving the block code output from the block detecting device and generating a feedback signal.

10 Claims, 7 Drawing Sheets

RECEIVER FOR BLOCK CODE IN NEAR-MINIMUM PHASE CHANNEL

BACKGROUND OF THE INVENTION

1. Field of the Invention

The present invention generally relates to the receiver and method of block code transmission, and more particularly to receiver and method that use Feed-Forward Equalizer (FFE) to convert the block signal into a signal with minimum phase, and further use Maximum Likelihood Sequence Estimation (MLSE) to generate the proper signal.

2. Description of the Prior Art

In recent years, continuous requirements for high-speed communication products have become the major object for many projects in IEEE802.11 Committee, one of them is how to use the new standard of 2.4 GHz within the frequency spectrum. Wherein FCC Part 15.247 uses spread spectrum techniques to transmit the packet of data over 10 Mbps. However, IEEE802.11 Committee only involves in the data transmission with the speed between 1 Mbps to 2 Mbps with the technology of Frequency Hopping (FH) or Direct Sequence (DS) Spread Spectrum (SS), while IEEE802.11b has established the transmission standard of Complementary Code Keying (CCK) that transmits data over 11 Mbps. It adopts the original property of Spread Spectrum (SS) to comply with the FCC requirement for Spread Spectrum signaling, with the new technology for receiver and by decreasing the average spectrum density of transmission, it increases the robustness of the signal to against interference. In addition, the new technology for receiver uses the spectral redundancy to eliminate self-interference created by multipath distortion. However, an extra equalizer is needed for 11 Mbps CCK modulation in order to improve the performance.

Figure 1:
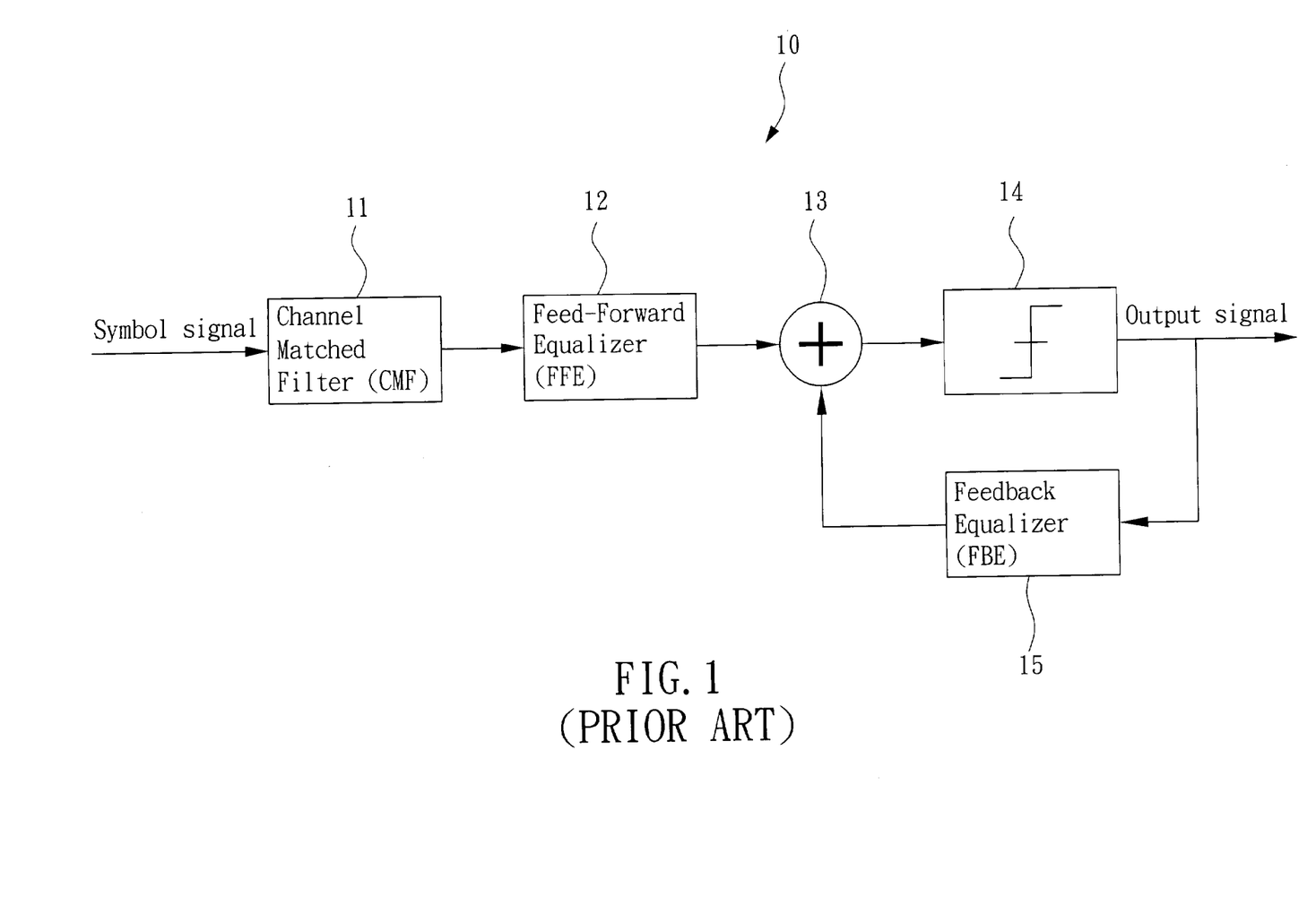
FIG. 1 is a diagram showing the structure of a conventional receiver in accordance with the prior art.

FIG. 1 is illustrating the structure of a common receiver that meets the requirement of IEEE802.11 CCK. As shown, the receiver 10 receives the block signal transmitted from a transmitter (not shown), and the block signal is further processed by a Channel Matched Filter (CMF) 11 to improve S/N ratio. Next, the block signal will be processed by Feed-Forward Equalizer (FFE) 12, Inter-Symbol Interference (ISI) eliminator 13 and Feedback Equalizer (FBE) 15 to eliminate the inter-symbol interference. Finally, the receiver will identify what the signal is with a slicer 14.

Although the receiver 10 uses the Channel Matched Filter (CMF) 11 to increase the S/N ratio of the block signal, however, the length of channel response is also increased. Moreover, if the original channel response is with minimum phase, after the Channel Matched Filter (CMF) 11, the channel response will become to be with non-minimum phase, which will cause the length of Feedback Equalizer (FBE) 15 to increase, so as the convergence of FBE become worse. Especially, in the wireless environment that the S/N ratio is worse, the Feedback Equalizer (FBE) 15 often converges to wrong settings; so, whatever long packet or short packet will not be received properly.

Figure 2:
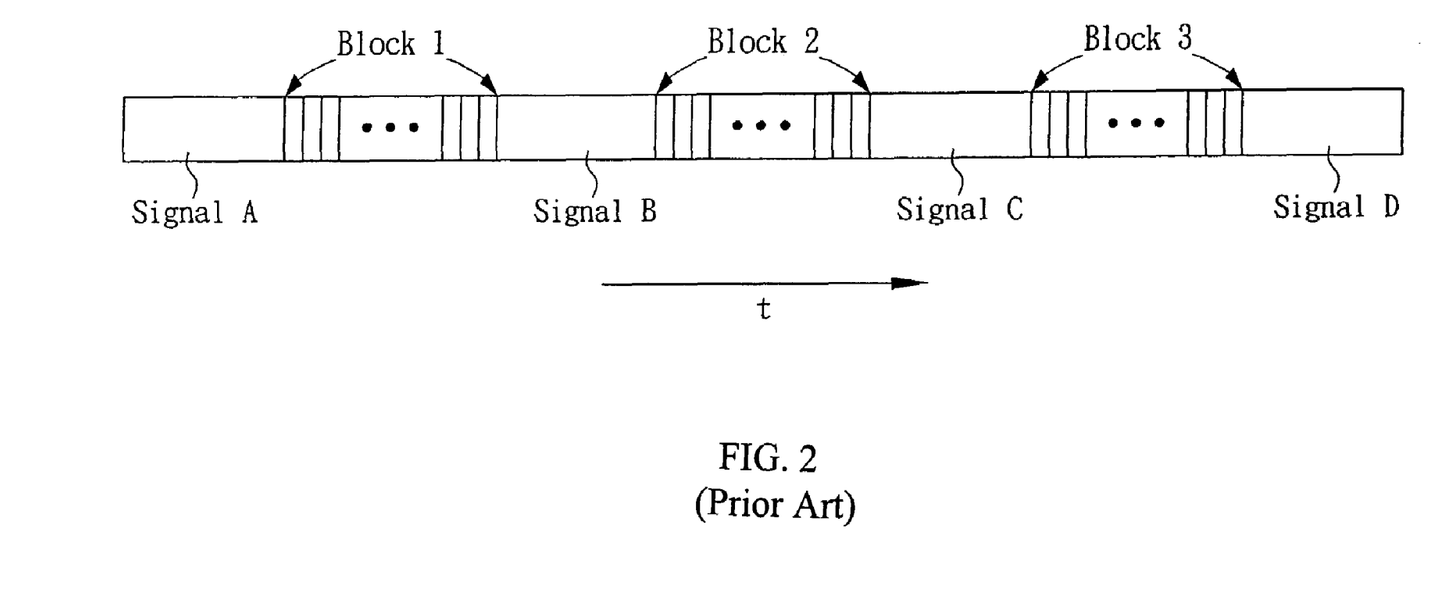
FIG. 2 is a diagram showing that the signal has been divided into a plurality of blocks, and known symbols have been inserted into between blocks.
Figure 3:
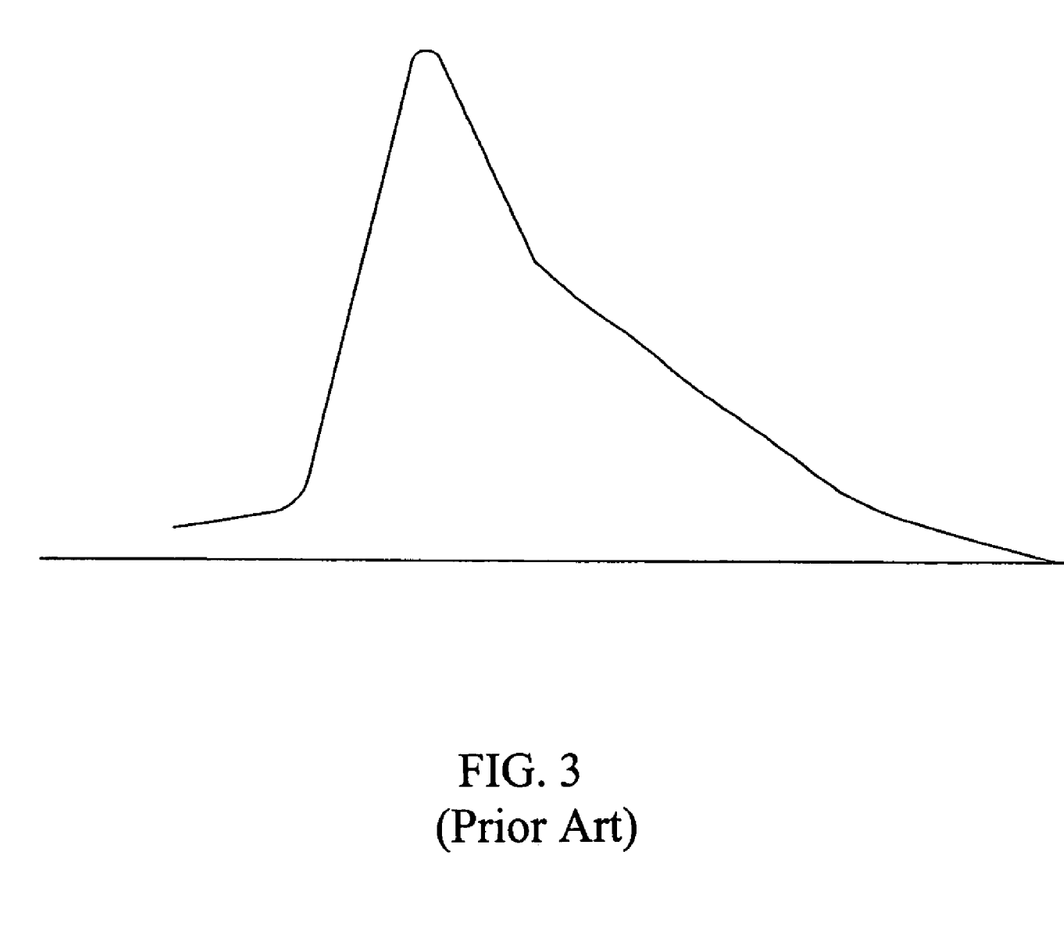
FIG. 3 is a diagram showing a signal without the interference from the precursor.

FIG. 2 is illustrating that the signal has been divided into a plurality of block signals for transmission. As shown in FIG. 2, indicating symbol inserted between block signals will reduce the interference within, the receiver receives the signal properly only by eliminating the interference, which will simplify the design of receiver and increase the receiving capability of the receiver. FIG. 3 is illustrating that, in an indoor wireless communication environment, the channel response is often with minimum phase and there is less pre-cursor interference. That means the symbol signal B will not interfere the signal block 1, the symbol signal C will not interfere the signal block 2, and the symbol signal D will not interfere the signal block 3. Thus, if the receiver is able to eliminate the inter-symbol interference created by the previous signal block interfering to the incoming signal block by adding (or deducting) the received signal block with the signal block being detected, as shown in FIG. 4.

Figure 4:
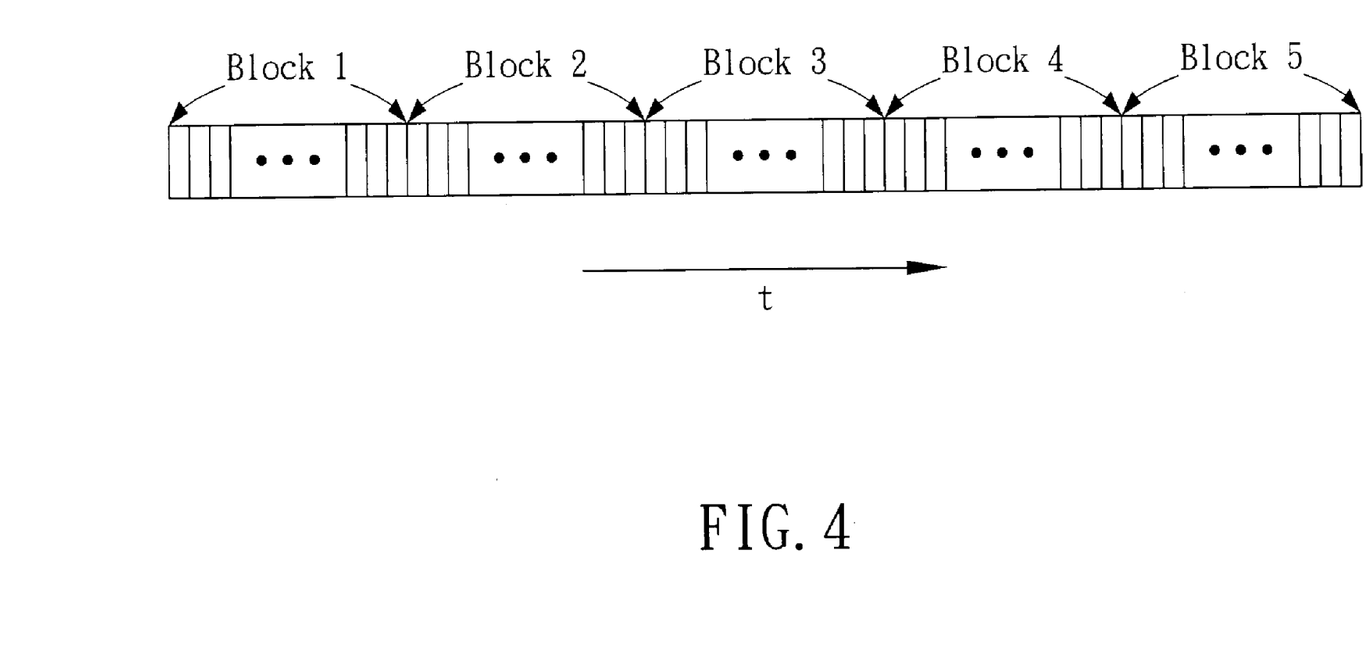
FIG. 4 is a diagram showing that the signal has been divided into a plurality of blocks, but known symbols have not been inserted into between blocks.

The same idea can apply to the modulation technology for IEEE802.11b Complementary Code Keying (CCK); similar signal transmission is shown in FIG. 4. In FIG. 4, the interference that signal block 1 interfering the signal block 2 can be eliminated first, and then the signal included in the signal block 2 will be resolved properly, so, the symbol signal will be no more transmitted to save bandwidth. In the modulation technology for IEEE802.11b Complementary Code Keying (CCK), each block in FIG. 4 will be regarded as a Symbol, and every Symbol includes 8 Quadrature Phase Shift Keying (QPSK) signal and every QPSK signal can be regarded as a Chip, that is, every Block (or Symbol) includes 8 Chips.

SUMMARY OF THE INVENTION

Accordingly, it is the primary object of the present invention to provide the receiver and method that is able to receive the Block Code properly.

To achieve the foregoing object, the receiver of the present invention comprises a feed-forward equalizer for receiving block signal and converting the block signal into a first signal with minimum phase; an inter-symbol interference (ISI) eliminator for receiving the first signal and a feedback signal that is used to eliminate the inter-symbol interference of the first signal, said eliminator also generates a second signal not having inter-symbol interference; a block detecting device for receiving the second signal and measuring the distance between the second signal and each block, and for selecting the block with the minimum distance as the best block output; and a feedback equalizer (FBE) for receiving the block output from the block detecting device and generating a feedback signal.

In order to make the channel more tend to be minimum phase, the receiver of the present invention uses feed-forward equalizer (FFE) to modify the channel response. Before the block signal being processed by the channel matched filter (CMF), the receiver and method of the present invention will eliminates the inter-symbol interference (ISI) detected between block signals to reduce the inter-symbol interference increased by the channel matched filter. In addition, a succeeding block detecting device will be employed to detect the block code under inter-chip interference (ICI) in order to reduce the effects of inter-chip interference caused by the channel and the channel matched filter. Moreover, the present invention makes use of the property of block symbol, the matrix calculation and the deduction of modified weightings of each block to make the maximum possible detection practicable to increase the capability of receiving.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

The present invention providing a receiver and a method for receiving block code can be exemplified by the preferred embodiment as described hereinafter.

Figure 5:
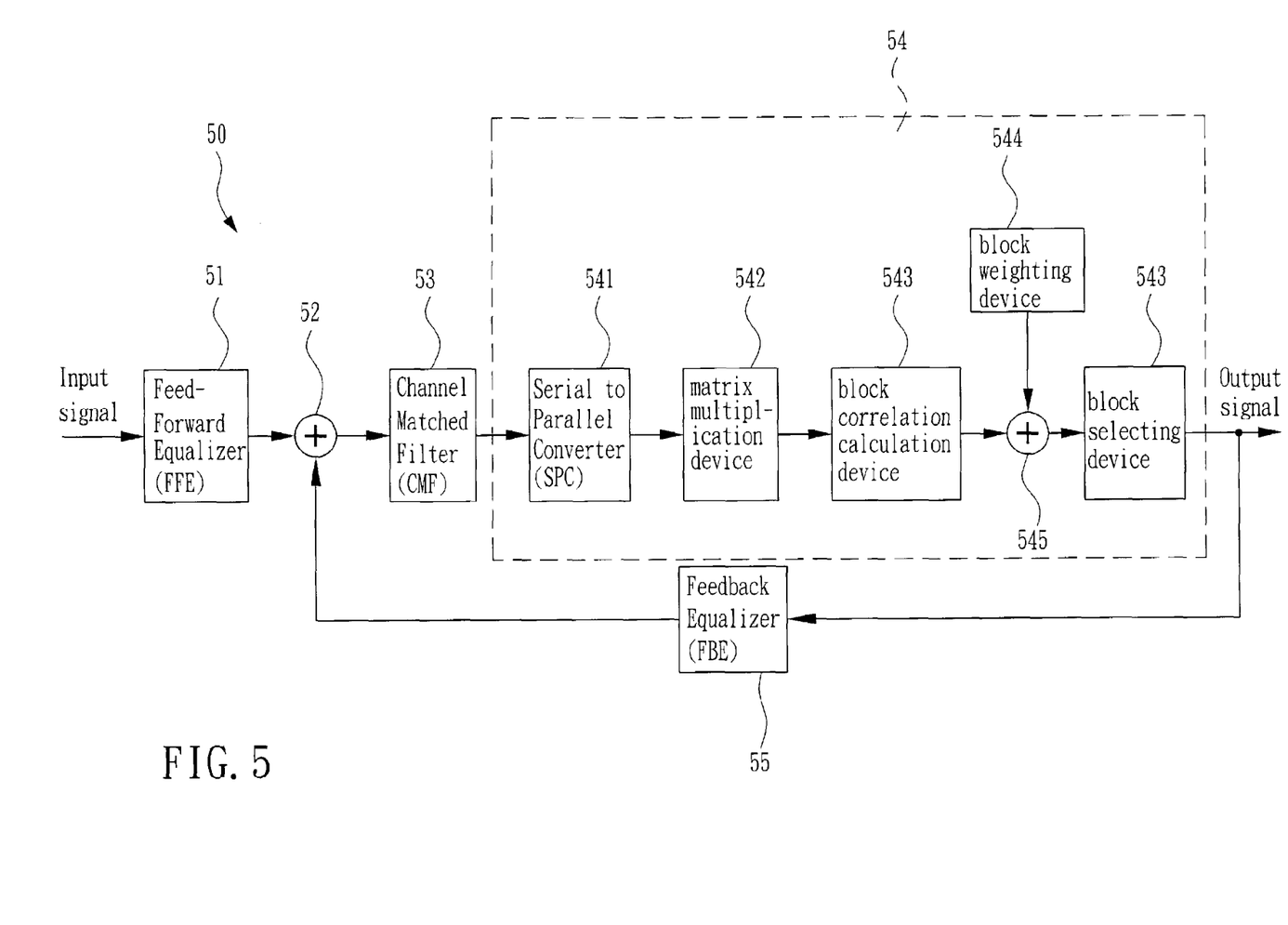
FIG. 5 is a diagram showing the structure of the receiver of the present invention.

Please refer to FIG. 5, which is a diagram showing the structure of the receiver of the present invention. As shown, the receiver 50 of the present invention comprises a Feed-Forward Equalizer (FFE) 51, an Inter-Symbol Interference (ISI) eliminator 52, a Channel-Matched Filter (CMF) 53, a block detecting device 54 and a Feedback Equalizer (FBE) 55.

In the present invention, the signal is transmitted in the form of block code. The receiver 50 uses the Feed-Forward Equalizer (FFE) 51 to make the whole channel have the property of minimum phase, and generate a first signal. A few parameters are involved for setting up the Feed-Forward Equalizer (FFE) 51. For example, if the Channel Response is $\lceil 1+1j, 2+2j, 0.5+0.5j \rfloor$, the 2+2j will be the Main-Path Response, the 1+1j will be the Pre-cursor Response and the 0.5+0.5j will be the Post-cursor Response. The parameter of the Feed-Forward Equalizer (FFE) 51 can be set up to $\lceil 2-2j, 1-1j \rfloor$, then the channel response behind the Feed-Forward Equalizer (FFE) 51 will be $\lceil 2,8,9,2 \rfloor$. Next, the system will set up $\lceil 8 \rfloor$ as the Main-Path response, $\lceil 2 \rfloor$ will be the Pre-cursor response and $\lceil 9,2 \rfloor$ will be the Post-cursor response. Therefore, the ratio of the Pre-cursor over the Main-Path can be enlarged by square times (e.g. ½ to ¼). Then, the parameter of the Feed-Forward Equalizer (FFE) 51 will be set up to be the conjugate number of the Main-Path of the Channel Response to reduce the intensity of the Feed-Forward interference. Of course, the parameters of the Feed-Forward Equalizer (FFE) 51 can be set up properly by zero forcing (ZF) criterion or by minimum mean square error (MMSE) criterion. After modified by the Feed-Forward Equalizer (FFE) 51, the first signal is only interfered by the signal received previously. The first signal therefore become the received signal and is defined as [R0~R7], and the relationship among the first signal [R0~R7], current received symbol [C0~C7], the previous received symbol [B0~B7], the channel response [h0~h7] and the noise [n0~n7] will be formulated as follows:

$R0=C0*h0+B7*h1+B6*h2+B5*h3+B4*h4+B3*h5+B2*h6+B1*h7+n0.$ $R1=C1*h0+C0*h1+B7*h2+B6*h3+B5*h4+B4*h5+B3*h6+B2*h7+n1.$ $R2=C2*h0+C1*h1+C0*h2+B7*h3+B6*h4+B5*h5+B4*h6+B3*h7+n2.$

.

.

$R7=C7*h0+C6*h1+C5*h2+C4*h3+C3*h4+C2*h5+C1*h6+C0*h7+n7.$

The Inter-Symbol Interference (ISI) of the first signal [R0~R7] can be eliminated by the Inter-Symbol Interference (ISI) eliminator 52 and a second signal [r0~r7] will be generated. The Inter-Symbol Interference (ISI) eliminator 52 mainly eliminates the interference between the previous-received symbol and the current received signal. The current signal is generated by the Feedback Equalizer (FBE) 55 based on the output block. Since the channel has become being with minimum phase after processed by the Feed-Forward Equalizer (FFE) 51, simple mathematic operation such as addition or deduction will be employed to modify the signal. The obtaining of the parameters of ISI eliminator 52 can be achieved by estimating the channel response after the Feed-Forward Equalizer (FFE) 51. For the second signal [r0~r7], only comprises current received symbol [C0~C7], the previous received symbol [B0~B7], the channel response [h0~h7] and the noise [n0~n7]; since the Inter-Symbol Interference (ISI) eliminator 52 already eliminates the interference between the received signals [B0~B7], so, the second signal [r0~r7], the output signal [C0~C7], the channel interference response [h0~h7] and the S/N [n0~n7] can be formulated as follows:

$r0=C0*h0++n0$ $r1=C1*h0+C0*h1+n1$ $r2=C2*h0+C1*h1+C0*h2+n2$

.

.

$r7=C7*h0+C6*h1+C5*h2+C4*h3+C3*h4+C2*h5+C1*h6+C0*h7+n7$

In addition, the receiver 50 uses the Channel-Matched Filter (CMF) 53 to increase the S/N ratio of the second signal to benefit the detecting of the incoming signal. The settings of the parameters of the Channel-Matched Filter (CMF) 53 can be obtained by estimating the channel response after the Feed-Forward Equalizer (FFE) 51. Since the Channel-Matched Filter (CMF) 53 is vary common in prior art, extra explanation for it will not be necessary. Even the Channel-Matched Filter (CMF) 53 increases the interference between signals, however, the interference is only limited in between Chips; that is so called the Inter-Chip Interference (ICI). Therefore, the obtained channel response can be used to determine the interference between blocks.

Finally, the receiver 50 will use the block detecting device 54 to determine the best value of the received block signals. The theory of Maximum Likelihood will be adapted in the block detecting device 54 for determining the best block signal. Formula (1) is the mathematic function, wherein $S_i$ represents the blocks that may be transmitted, R is the input signal, in here, R is the received signal without ISI/ICI.

$$\min_i |R - S_i|^2. \quad \text{Formula (1)}$$

Taking IEEE 802.11b as example, wherein i can be 1 to 256. Since these 256 blocks are transformed from 64 blocks with 4 possible phases, that is, 0 degree, 90 degrees, 180 degrees and 270 degrees, we can just compare the 64 blocks that being transformed with 0 degrees. After the most possible block being selected for transmission, the phase difference between the received signal and the most possible signal selected for transmission will be obtained to determine the phase transformation for transmission. After that, we will be able to find out the most possible signal sent by the sender.

However, the Inter-Chip Interference still exists, the channel response shall be put into consideration. Formula (2) is the mathematic function that takes the channel response into account.

$$\min_i |R - \underline{H} \times \underline{S}_i|^2. \quad \text{Formula (2)}$$

Even Formula (2) can be used to determined the relation between the received signal and the block, however, when Formula (2) is applied for detecting signal, the whole channel response and the block being changed have to be obtained first, then, the comparison has to be applied to each received signals, doing so wastes so much memory space. Therefore, Formula (2) can be resolved further to be Formula (3) as follows:

$$\max_i \left( R^H \times \underline{H} \times \underline{S}_i - \frac{1}{2} \underline{S}_i^H \times \underline{H}^H \times \underline{H} \times \underline{S}_i \right). \quad \text{Formula (3)}$$

Wherein the matrix with H appealing on the upper right corner means the matrix is the Hermitian transformation of original matrix.

The deduction for Formula (2) to Formula (3) is as follows:

$$\min_i |R - \underline{H} \times \underline{S}_i|^2 = \min_i (R - \underline{H} \times \underline{S}_i)^H \times (R - \underline{H} \times \underline{S}_i)$$
$$= \min_i (R^H \times R - 2 \times R^H \times \underline{H} \times \underline{S}_i + \underline{S}_i^H \times \underline{H}^H \times \underline{H} \times \underline{S}_i)$$
$$= \max_i \left( R^H \times \underline{H} \times \underline{S}_i - \frac{1}{2} \underline{S}_i^H \times \underline{H}^H \times \underline{H} \times \underline{S}_i \right)$$

When Formula (3) applies, the received signal and the channel response will be calculated by matrix multiplication. The correlation of blocks is therefore obtained. Since the properties of blocks are certain, simple mathematic operations will be applied for calculation. For example, for the specification of WLAN 802.11b, Walsh Transform will be used for calculation. Eventually, the best value will be obtained by deducting the weighting of the block. Since the receiver involves many mathematic calculations; such as the calculation for the response of the whole channel, for the weighting of block, for the matrix operation between the channel match filtering and the inter-symbol interference, parallel multiplication and addition operation can be adopted for the receiver to save the space of hardware.

As shown in FIG. 5, the block detecting device 54 comprises a Serial to Parallel Converter (SPC) 541, a matrix multiplication device 542, a block correlation calculation device 543, a block weighting device 544, a weighting processing device 545 and a block selecting device 546. Referring to Formula (3), the Serial to Parallel Converter (SPC) 541 is used to transform the second signal ⌈r0~r7⌋ (serial signal) to parallel signal, which is the Hermitian transformation of the second signal ⌈r0~r7⌋. The matrix multiplication device 542 is used to perform the matrix multiplication for the second signal ⌈r0~r7⌋ being Hermitian transformed and the whole channel response, and the block correlation calculation device 543 is used to obtain the correlation between the received signal and the blocks. The block weighting device 544 is used to provide the weighting corresponding to each block, and the weighting processing device 545 is used to adjust the correlation for each block based on the weighting. Finally, the block selecting device 546 will select a block with the best correlation and output that block.

Since the block detecting device described above processes the received block one by one, therefore for the specification of IEEE 802.11b, the system will receive 8 serial signals before processing, so, the Serial to Parallel Converter (SPC) 541 is added in front of the block detecting device.

The matrix multiplication device 542 and the block correlation calculation device 543 are used to handle the portion of $(R^H \times \underline{H}) \times \underline{S}_i$. The matrix multiplication device 542 is responsible for $A = R^H \times \underline{H}$, and the block correlation calculation device 543 is for $A \times \underline{S}_i$. The block weighting device 544 will perform $$\frac{1}{2} \cdot \underline{S}_i^H \times \underline{H}^H \times \underline{H} \times \underline{S}_i$$

to obtain the weighting for each block. When the transmission channel changed (<u>H</u> changed), recalculation will be performed. In the case, $A = \underline{S}_i \times \underline{H}$ (can be obtained by the block correlation calculation device 543) will perform first, then $$\frac{1}{2} A^H \times A.$$

If the transmission channel is good (no ISI), the block weighting device 544 and the weighting processing device 545 can be omitted, however, in general, the transmission channel is not ideal enough, so the weighting for each block is different.

Since the receiver of the present invention uses feedforward equalizer (FFE) to modify the channel response, which makes the channel more tend to be with minimum phase and benefits the succeeding process. Before the block signal being processed by the channel matched filter (CMF), the receiver and method of the present invention will eliminates the inter-symbol interference (ISI) detected between block signals to reduce the inter-symbol interference increased by the channel matched filter. In addition, a succeeding block detecting device will be employed to detect the block code under inter-chip interference (ICI) in order to reduce the effects of the inter-chip interference caused by the channel and the channel matched filter. Moreover, the present invention makes use of the property of block symbol, the matrix calculation and the deduction of modified weightings of each block to make the maximum possible detection practicable to increase the capability of receiving.

Figure 6:
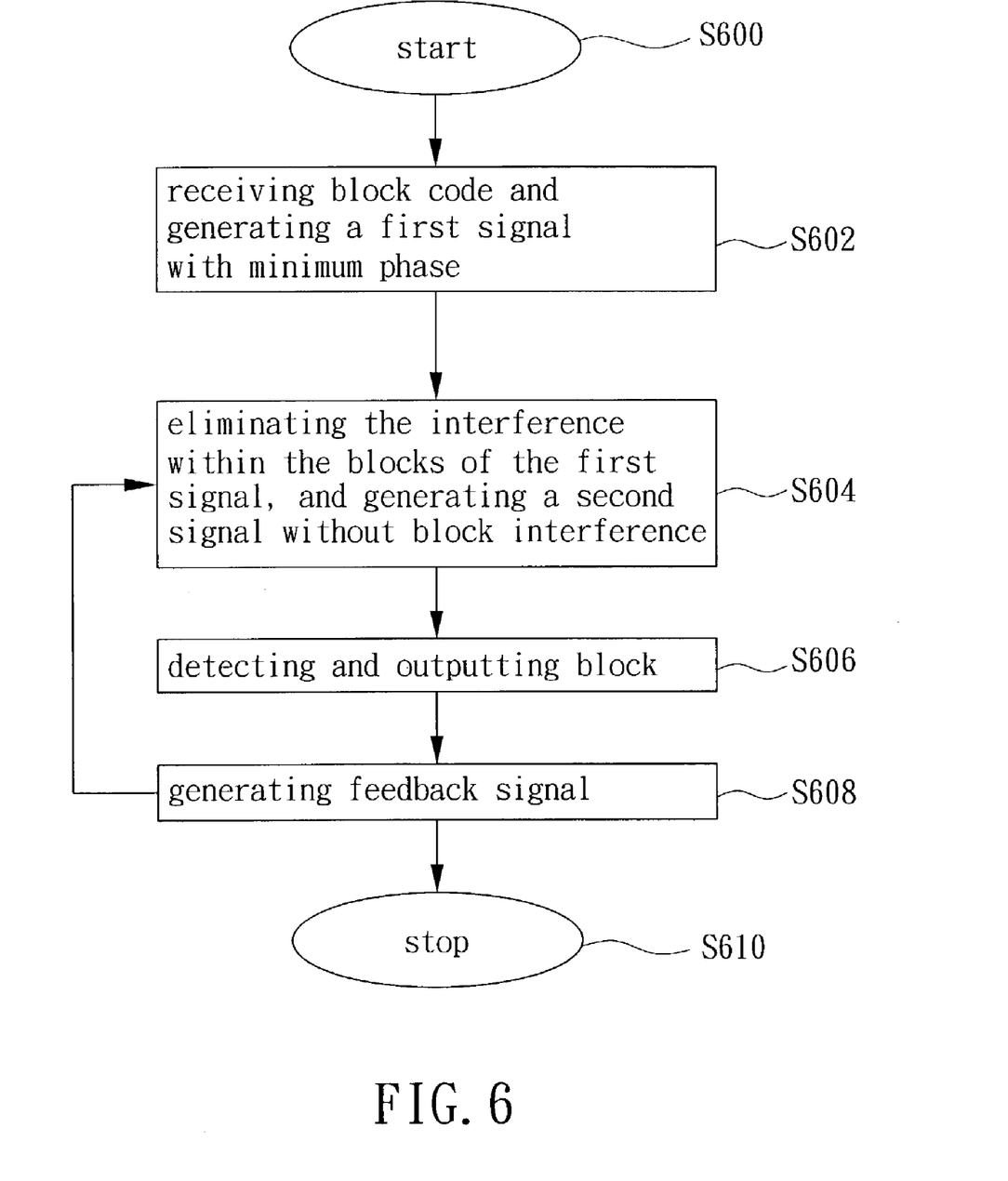
FIG. 6 is a schematic block diagram of the method of receiving block code of the present invention.

FIG. 6 is a schematic block diagram of the method of receiving block code of the present invention, which comprises the steps of:

step 600 of start;

step 602 of generating signal with minimum phase, which is receiving block code and generating a first signal with minimum phase;

step 604 of eliminating interference between blocks, which is receiving the first signal and a feedback signal that is used for eliminating the interference within the blocks of the first signal, and generating a second signal without block interference;

step 606 of detecting block, which is receiving the second signal, performing the calculation for the correlation for the second signal and each block and selecting the possible block with the minimum distance and output that block;

step 608 of generating feedback signal, which is receiving the block output from the block detecting device and generating the feedback signal;

step 610 of stop.

In addition, between step 604 and step 606, a step of channel matched filtering can be added to increase S/N ratio.

Figure 7:
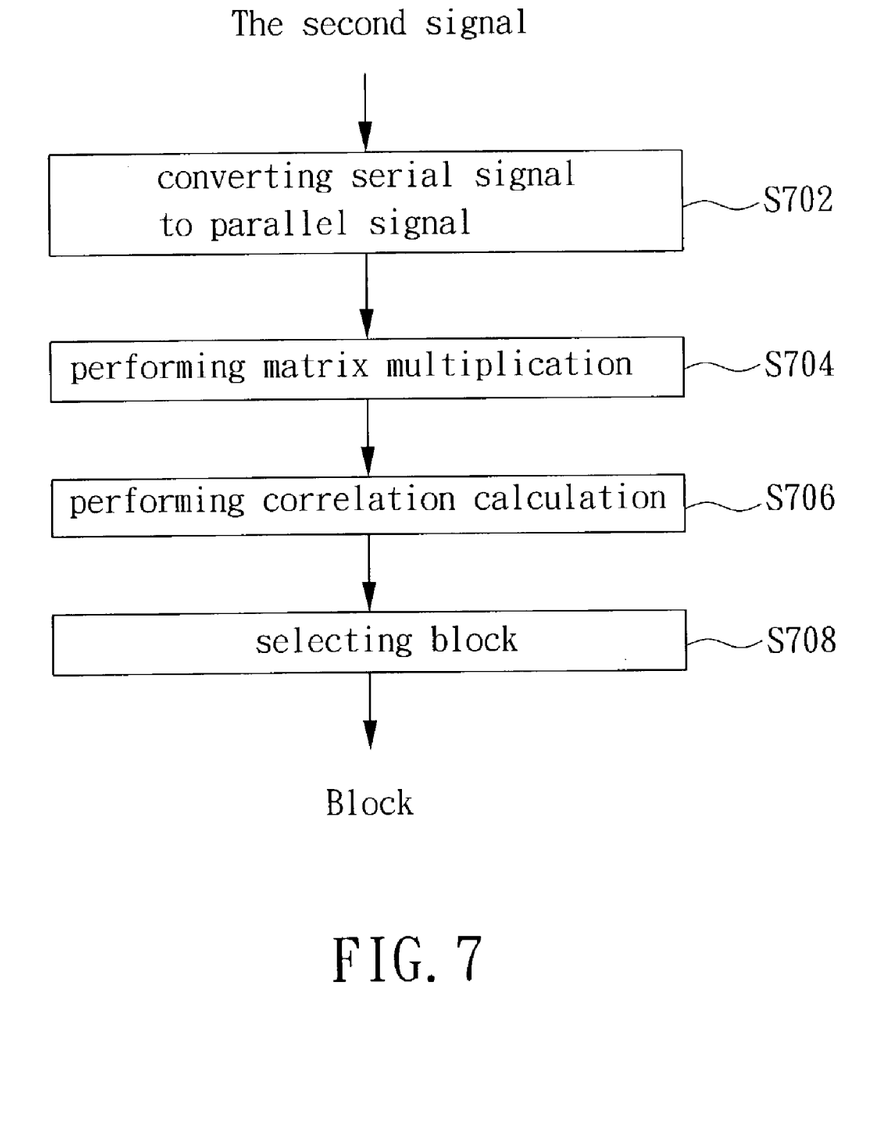
FIG. 7 is a schematic block diagram of detecting block code for FIG. 6.

FIG. 7 is a schematic block diagram of detecting block code, which comprises the following steps:

step S702: converting serial to parallel, which is converting the second signal (serial) to a parallel signal;

step S704: performing matrix multiplication, which is performing matrix multiplication for the whole channel response and the parallel signal output from the step S702;

step S706: performing correlation calculation, which is calculating the possible correlation between the possible block and the signal output from step S704;

step S708: selecting block, which is selecting the block with the minimum distance as the best block.

In addition, the step of block weighting generating is included in detecting block code to provide the weighting for each block, another step of weighting processing is also included between the step of performing correlation calculation and the step of selecting block to adjust the weighting for the correlation of each block according to each weighting output from the step of block weighting generating.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A receiver for block code transmission, which comprising:

a Feed-Forward Equalizer (FFE) receiving block signal and converting the block signal into a first signal with minimum phase;

an Inter-Symbol Interference (ISI) eliminator receiving the first signal and a feedback signal and the feedback signal is used to eliminate the Inter-Symbol Interference of the first signal, and the Inter-Symbol Interference (ISI) eliminator also generates a second signal not having Inter-Symbol Interference;

a block detecting device receiving the second signal and measuring the distance between the second signal and each possible block, and selecting the block code with the minimum distance as the best output block code, the block detecting device comprising:

a Serial to Parallel Converter (SPC) converting the second signal to a parallel signal;

a matrix multiplication device performing matrix multiplication for whole channel response and the parallel signal converted from the serial signal;

a block correlation calculation device calculating the correlation between the signal output from the matrix multiplication device and each possible block; and a block selecting device selecting the block with the minimum distance as the best block;

a channel matched filter placed between the Inter-Symbol Interference (ISI) eliminator and the block detecting device to increase S/N ratio; and a Feedback Equalizer (FBE) receiving the block code output from the block detecting device and generating the feedback signal.

2. The receiver for block code transmission of claim 1, wherein the block detecting device further comprises:

a block weighting device providing weighting for each block; and a weighting processing device, placed between the block correlation calculation device and the block selecting device, adjusting the weighting for the correlation of each block according to each weighting output from the block weighting device.

3. A method of receiving block code transmission, which comprising:

generating signal with minimum phase, which is receiving a block signal and converting the block signal into a first signal with minimum phase;

eliminating interference between blocks, which is receiving the first signal and a feedback signal that is used for eliminating the interference within the blocks of the first signal, and generating a second signal without block interference;

channel matched filtering the second signal to increase S/N ratio;

detecting block, which is receiving the filtered second signal, performing the calculation for the correlation for the filtered second signal and each block and selecting the possible block with the minimum distance and output that block; and generating feedback signal, which is receiving the block output from the block detecting device and generating the feedback signal;

wherein the step of detecting block further comprising:

converting serial to parallel, which is converting the second signal to a parallel signal;

performing matrix multiplication, which is performing matrix multiplication for whole channel response and the parallel signal output from the step of converting serial to parallel;

performing correlation calculation, which is calculating the possible correlation between possible blocks and the signal output from the step of performing matrix multiplication; and selecting block, which is selecting blocks with the minimum distance as the best block.

4. The method of receiving block code transmission of claim 3, wherein the step of detecting block further comprises:

generating block weighting for providing the weighting for each block;

weighting processing placed between the step of performing correlation calculation and the step of selecting block to adjust the weighting for the correlation of each block according to each weighting output from the step of generating block weighting.

5. A communications receiver, comprising:

a feed-forward equalizer for performing equalization on an input signal and generating a first signal;

an inter-symbol interference eliminator coupled to the feed-forward equalizer, for performing calculation on the first signal and a feedback signal, and generating a second signal;

a channel matched filter coupled to the inter-symbol interference eliminator, for performing filtering on the second signal;

a maximum likelihood sequence detector coupled to the channel matched filter, for receiving the filtered second signal by the channel matched filter and determining an output block code according to the received filtered second signal; and a feedback equalizer coupled to the maximum likelihood sequence detector and the inter-symbol interference eliminator, for receiving the output block code from the maximum likelihood sequence detector and generating the feedback signal;

wherein the maximum likelihood sequence detector measures a distance between the received filter second signal and each possible block code, and selects the block code with the minimum distance to be the output block code, and wherein the maximum likelihood sequence detector comprises:

a serial to parallel converter for converting the filtered second signal to a parallel signal;

a matrix multiplication device for performing matrix multiplication on a channel response and the parallel signal;

a block correlation calculation device for calculating the correlation between the result of the matrix multiplication device and each possible block code; and a block selecting device for selecting the block code with the minimum distance to be the output block code.

6. The communications receiver of claim 5, wherein the maximum likelihood sequence detector further comprises:

a block weighting device for providing weighting for each possible block code; and a weighting processing device coupled between the block correlation calculation device and the block selecting device, for adjusting the weighting for the correlation of each possible block code according to the weighting provided by the block weighting device.

7. The communications receiver of claim 5, wherein the channel matched filter filters the second signal to improve S/N ratio.

8. The communications receiver of claim 5, wherein the inter-symbol interference eliminator performs calculation on the first signal and a feedback signal, to generate the second signal having reduced inter-symbol interference than the first signal.

9. The communications receiver of claim 5, wherein the feed-forward equalizer generates the first signal with minimum phase.

10. The communications receiver of claim 5, wherein the communications receiver receives signals conforming to IEEE 802.11 standard.

* * * * *